April 4, 1967  K. G. PORGES ET AL  3,312,908
DEVICE FOR SUPERREGULATION OF AN
AMPLIFIER-DISCRIMINATOR CIRCUIT
Filed May 15, 1964  3 Sheets-Sheet 1

INVENTORS
Karl G. Porges
John A. Bjorkland
BY
Roland A. Graham
Attorney

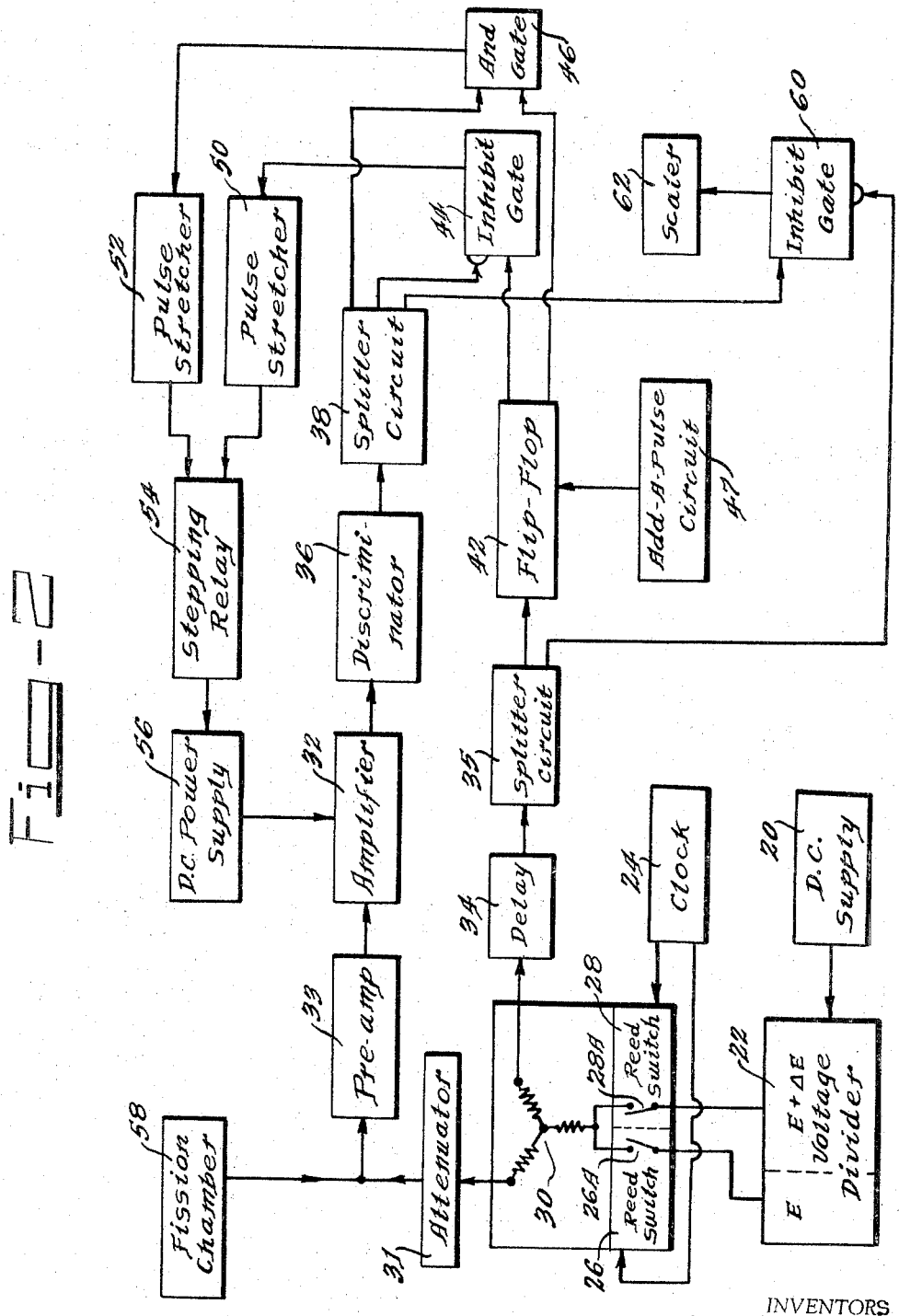

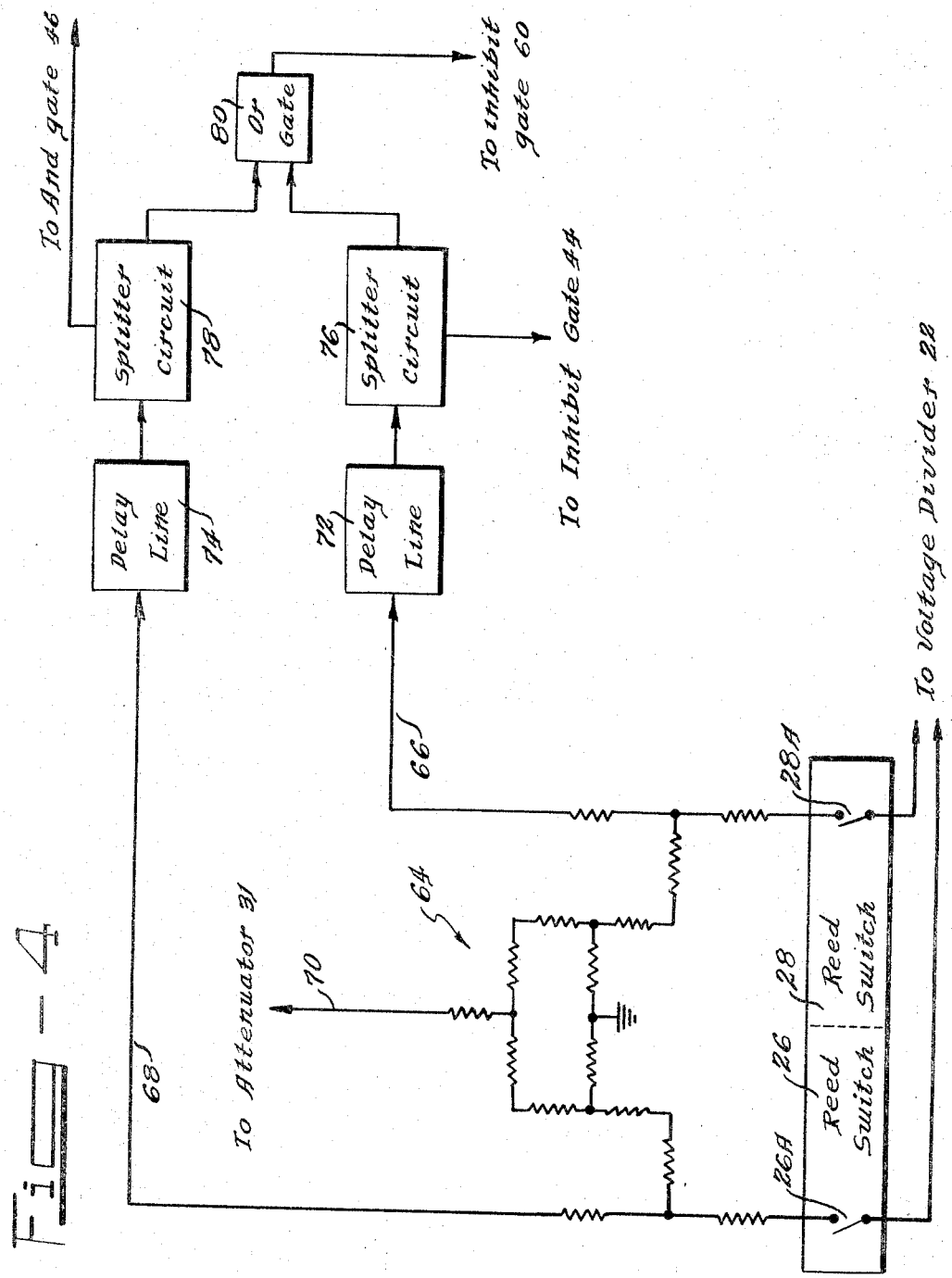

3,312,908
DEVICE FOR SUPERREGULATION OF AN AMPLIFIER-DISCRIMINATOR CIRCUIT
Karl G. Porges and John A. Bjorkland, both of Evanston, Ill., assignors to the United States of America as represented by the United States Atomic Energy Commission
Filed May 15, 1964, Ser. No. 367,905
5 Claims. (Cl. 330—52)

The invention described herein was made in the course of, or under, a contract with the United States Atomic Energy Commission.

This application relates to regulatory devices and more particularly to a device for superregulation of an amplifier-discriminator circuit.

In the nuclear art, it is sometimes required that analog signals from a nuclear detector (fast rising voltage or current pulses) be amplified at bandwidths up to 200 mc./sec. The bandwidth is necessary either to maintain precise timing or to keep the pulse widths short, thereby avoiding pileup and overloading. The amplification is required to permit conversion of the analog information (pulse height and/or shape) to digital information through discrimination.

At such large bandwidths it is difficult to stabilize the amplifier gain as well as the discriminator threshold so as to make them insensitive to variations in circuit element characteristics. This lack of stability is undesirable in many instances. For example, where the output of a detector of nuclear particles or gamma rays comprises pulses having different pulse heights and the number of pulses per unit pulse height increases rapidly as the pulse height decreases, relatively small changes in amplifier gain and/or discriminator threshold result in significant changes in count rate. Such instrumental count rate fluctuations may mask actual small changes in the intensity of the nuclear radiations, thereby giving erroneous experimental information.

It is therefore one object of the present invention to provide a device for the superregulation of an amplifier-discriminator circuit.

It is another object of the present invention to provide a device for digital superregulation of an amplifier-discriminator circuit.

Other objects will become more apparent as the detailed description proceeds.

In general, the present invention comprises means for generating pulses alternately having amplitude values above and below the level of the discriminator and for applying these pulses to the input of the amplifier-discriminator circuit to be regulated. Logic means are used to detect which of the applied pulses are transmitted through the amplifier-discriminator circuit, which detected pulses are indicative of drift of the amplifier-discriminator circuit. Means are provided responsive to the logic means for adjusting the gain of the amplifier-discriminator circuit in accordance therewith.

Further understanding of the present invention may best be obtained from consideration of the accompanying drawings wherein:

FIG. 2 is a detailed block diagram of an embodiment of the device for the present invention, FIG. 4 is a block diagram of a modification to the embodiment of FIG. 2 to provide automatic synchronization therefor.

Figure 1:
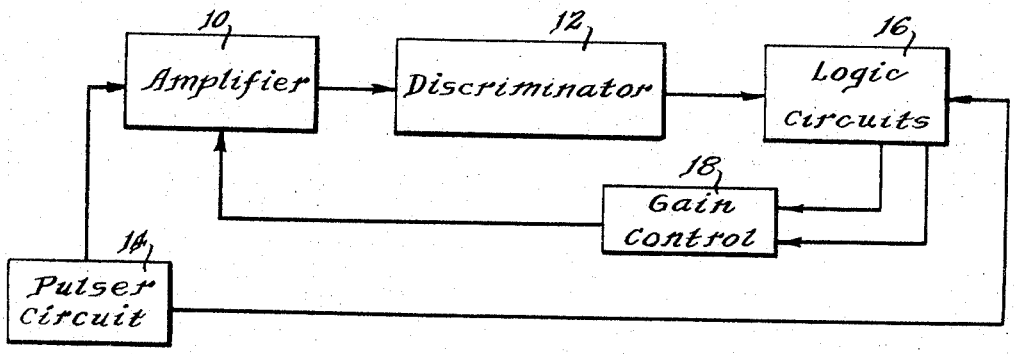
FIG. 1 is a block diagram of the basic device for the present invention.

The device of the present invention is illustrated in its basic form in FIG. 1. Amplifier 10 and discriminator 12 are the elements to be regulated. A pulsing circuit 14 generates pulses alternately having a low and high amplitude value. The amplitude of the low pulses is just below the level of discriminator 12 and the amplitude of the high pulses is just above the level of discriminator 12. The pulses from the pulsing circuit 14 are fed to the input of the amplifier 10 and an input of a logic circuit 16 as shown. The output from discriminator 12 is fed to another input of logic circuit 16. As the gain of the amplifier 10 increases and/or the threshold of the discriminator 12 decreases, the low amplitude pulses will pass through the discriminator 12 whereas normally they will not. As the gain of amplifier 10 decreases or the threshold of discriminator 12 increases, the high amplitude pulses will fail to pass through the discriminator whereas normally they will.

Logic circuit 16 receives all pulses transmitted through discriminator 12. As low and high amplitude pulses are generated by pulsing circuit 14 and fed to amplifier 10, reference pulses therefor are generated and transmitted to logic circuit 16. Responsive to coincidence or non-coincidence between the pulses transmitted through the amplifier 10 and the reference pulses, logic circuit 16 generates two outputs which are fed to a gain control circuit 18. One of the outputs from logic circuit 16 denotes decrease in the gain of the amplifier 10 or increase in threshold of discriminator 12 and results from non-passage of high amplitude pulses through the amplifier 10 or discriminator 12 circuits. The other output of logic circuit 16 denotes an increase in the gain of the amplifier 10 or decrease in the level of discriminator 12 and results from passage of low amplitude pulses through amplifier 10 or discriminator 12 circuits. The two outputs from logic circuit 16 therefore represent decrease or increase in the gain of amplifier 10 and/or increase or decrease in the level of discriminator 12.

The two outputs from the logic circuit 16 are then fed to a gain regulator circuit 18 which, responsive thereto, appropriately corrects the gain of the amplifier 10, thereby correcting for changes in the gain of the amplifier 10 and/or level of the discriminator 12.

FIG. 2 illustrates a detailed embodiment of the device for the present invention. A D.-C. supply 20 is connected across a voltage divider network 22 which is constructed so that two voltage outputs E and $E+\Delta E$ are obtained therefrom. A clock 24 (a conventional periodic signal generator) has its output alternately connected to the driving coils of two mercury-wetted reed switches 26 and 28. The contacts 26A and 28A of switches 26 and 28 are connected as shown between the voltage divider 22 and a splitter network 30. The two outputs of the splitter network 30 are each identical trains of pulses alternately having a low amplitude value of E and a high amplitude value of $E+\Delta E$. The differential in amplitude ($\Delta E$) between the pulses from splitter network 30 is determined from the amount of noise at the output of amplifier 32, the value of $\Delta E$ always being greater than the amplitude of the noise.

One of the outputs of splitter network 30 is connected via attenuator 31 to the input of a preamplifier 33 and the other connected through a delay line 34 to a second splitter circuit 35. The two outputs of splitter circuit 30 are therefore two identical trains of pulses, each train comprising alternate high and low amplitude pulses. The attenuator 31 reduces the amplitude of the pulses applied to the preamplifier 33 and amplifier 32 to compensate for the gain thereof so that the pulses arrive at discriminator 36 with the correct amplitude.

Thus, one train of pulses from the splitter circuit 30 passes through the attenuator 31, preamplifier 33, amplifier 32 to discriminator 36, any output from the discriminator being fed to a splitter circuit 38. The other train of pulses from the splitter circuit 30 is fed through a delay line 34 to splitter circuit 35. Splitter circuit 35 divides the pulse train into two identical pulse trains, one of which is fed to a flip-flop circuit 42 of conventional design. The flip-flop circuit 42 sorts the alternate high and low amplitude pulses into two pulse trains of only high and only low amplitude pulses. The high amplitude pulse train output from flip-flop circuit 42 is connected to an input of inhibit gate 44. The other input of inhibit gate 44 is connected to the output of splitter circuit 38. The low amplitude pulse train output from flip-flop circuit 42 is connected to an input of "and" gate 46. The other input of "and" gate 46 is connected to the output of splitter circuit 38.

As a low amplitude pulse (E) is generated and applied to the preamplifier 33 the reference pulse therefor is applied to the input of "and" gate 46 from flip-flop circuit 42. The condition of the reference pulse applied to the "and" gate 46 may be written in algebraic notation as L. If the gain of the preamplifier 33 and amplifier 32 or level of discriminator 36 is correct there will be no output from the discriminator 36 and no input to the other input of "and" gate 46. This absence of input from discriminator 36 may be written in algebraic notation as $\bar{D}$. The "and" gate 46 generates an output only if simultaneous inputs appear, which conditions may be written as LD. Thus, under normal operating conditions $L\bar{D}$, the "and" gate 46 delivers no output.

When a high amplitude pulse ($E+\Delta E$) is generated and applied to preamplifier 33, the reference pulse therefor is fed to an input of inhibit gate 44 via flip-flop circuit 42. The presence of the reference pulse applied to inhibit gate 44 may be algebraically written as H. If the gain of preamplifier 33 and amplifier 32 or level of discriminator 36 is correct, there will be an output from discriminator 36 which is applied via splitter circuit 38 to the other input of inhibit gate 44. This condition may be algebraically written as D. Inhibit gate 44 generates an output only if condition $H\bar{D}$ exists and therefore under normal operating conditions of HD the gate 44 will generate no output. Thus gates 44 and 46 generate outputs only when the gain of preamplifier 33 and amplifier 32 or level of discriminator 36 changes from normal, the particular output being indicative of the polarity of compensation required to maintain regulation.

Figure 3:
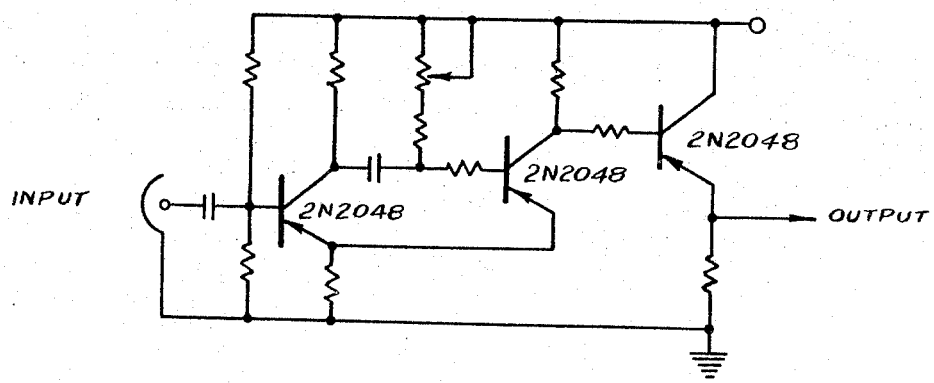
FIG. 3 is a detailed line diagram of an element of the embodiment of FIG. 2.

The output pulses from inhibit gate 44 and "and" gate 46 are fed to pulse stretching circuits 50 and 52 respectively. Here the pulses are stretched from micro or nanosecond length to millisecond length to make them suitable for driving relay coils or other current-operated electromechanical devices. The pulse stretching circuits 50 and 52 are identical, one of them being illustrated in detail in FIG. 3. The pulse-stretching circuit of FIG. 3 is a conventional capacitively coupled Schmitt trigger circuit and an emitter follower amplifier to insure optimum coupling of the pulse-stretching circuit to the coils of relay 54. The output pulse length of the Schmitt trigger circuit is independent of input pulse length and determined only by the RC time constant of the circuit. The stretched pulse outputs of circuits 50 and 52 are then applied to the driving coils of a bidirectional stepping relay 54 whose contacts are connected to tapped outputs of a D.-C. power supply 56. The output of "and" gate 46 actuates stepping of the relay contacts in one direction while the output of inhibit gate 44 actuates stepping of the relay contacts in the opposite direction. The output from the D.-C. voltage supply 56 is connected via the contacts of the stepping relay 54 to the grid bias of one stage of amplifier 32.

Thus, responsive to an $H\bar{D}$ condition on inhibit gate 44 stepping relay 54 is actuated to effect a smaller (less negative) grid bias on a stage of amplifier 32, thereby increasing the quiescent plate current thereof and the gain of the amplifier 32 until an HD condition (normal operation) is restored to the inhibit gate 44. An LD condition on "and" gate 46 actuates stepping relay 54 to effect an increase in grid bias on a stage of amplifier 32, thereby decreasing the quiescent plate current thereof and the gain until an $L\bar{D}$ condition (normal operation) is restored to the "and" gate 46.

The fractional gain change in the stage of amplifier 32 ($\pm \Delta G/G$) responsive to each output pulse of gates 44 and 46 is of a value equal to or less than the fractional difference between the applied pulses ($\Delta E/E$). This value is used so that oscillation is avoided. Thus, with an abrupt gain excursion larger than $\pm \Delta G/G$, gates 44 and 46 continue to deliver correction signals to stepping relay 54 until the gain is restored to its normal value.

The embodiment of FIGURE 2 further shows in-circuit operation of the present invention. Fission chamber 58 feeds into the same preamplifier 33 as the pulse train from splitter circuit 30. An inhibit gate 60 has two inputs connected to splitter circuits 35 and 38 respectively, thereby receiving pulses passing through preamplifier 33, amplifier 32 and discriminator 36 and the reference pulse train from splitter circuit 35. The reference pulse train acts as a "VETO" input to the inhibit gate 60 and the pulses from splitter 38 act as a "YES" input to inhibit gate 60. Thus, whenever high or low amplitude pulses from splitter 30 pass through amplifier 32 to inhibit gate 60, no output therefor is given by the gate 60. In operation, inhibit gate 60 will thus give an output only for counts detected by chamber 58. The output of gate 60 is fed to a scaler 62 for recording of the data.

For correct operation of the logic circuitry in the embodiment of FIGURE 2 it is necessary that the flip-flop pulse sorter circuit 42 be in phase with the clock 24 driving reed switches 26 and 28. This may be effected by a simple circuit 47 which injects one additional pulse into the flip-flop circuit 42 as required for starting operation. Such a circuit 47 comprises a D.-C. voltage source which is temporarily connected via a detent switch to flip-flop circuit 47, thereby inserting a pulse therein. This pulse changes the state of flip-flop circuit 42 so that the high and low amplitude pulse trains thereof are directed to their proper gates 44 and 46.

FIGURE 4 illustrates a modification of the device of FIGURE 2 whereby the flip-flop circuit 42 is eliminated and separate pulse trains of high only and low only pulses are fed to the logic circuitry. In this embodiment, the reed switch contacts 26A and 28A are not connected in common as in FIGURE 2 but are separately connected into an add-split circuit 64 as shown. The add-split circuit 64 has three outputs 66 (low amplitude pulses E only), 68 (high amplitude pulses $E+\Delta E$ only) and 70 (alternating low and high amplitude pulses). The output 70 is connected to the input of attenuator 31 of the device in FIGURE 2. Outputs 66 and 68 are connected to identical delay lines 72 and 74, respectively, which in turn are connected to identical two-way splitter circuits 76 and 78. One output of splitter circuit 76 is fed to the input of inhibit gate 44 of the device of FIGURE 2. One output of splitter 78 is fed to the input of "and" gate 46 of the device of FIGURE 2. The other outputs of splitters 76 and 78 are fed to the inputs of an "or" gate 80 whose output therefrom is a pulse train of pulses having alternate high and low amplitude which is in turn applied to the input of inhibit gate 60. This modification of the device of FIGURE 2, replacing elements 30, 34, 35, 42 and 47 thereof, inherently maintains synchronism between clock 24 and the gates 44 and 46 as opposed to imposed synchronism present in the device of FIGURE 2.

For operation of the embodiment of FIGURES 2 and 4, clock 24 is initially turned off or the super-regulation circuit otherwise disengaged. The gain of preamplifier 33, amplifier 32 and threshold discriminator 36 are adjusted to accept certain pulses from detector 58 and reject unwanted radiations and/or noise. The voltage divider 22 and attenuator 31 are carefully adjusted so that their outputs results in high and low amplitude pulses which straddle the level of discriminator 36. The superregulation circuit is then turned on (clock 24 energized) and superregulation of preamplifier 33, amplifier 32, and discriminator 36 thereby effected.

The rate of clock 24 does not have to be high in order to achieve adequate superregulation. Rates of approximately one cycle per second have been found satisfactory to regulate the relatively slow and infrequent small gain excursions exhibited by wideband amplifiers having good quality components and regulated A.-C. At these pulse rates, the increase in dead time of the amplifier channel due to the presence of the pulses is negligible.

The percent regulation achievable with the device of FIGURES 2 and 4 is approximately equal to the root mean square of the noise present at the output of amplifier 32 divided by the discriminator level. Pulses injected into the amplifier channel to effect regulation thereof emerge with the full noise of preamplifier 33 superposed thereon. Thus, the height of each pulse becomes uncertain by an amount approximately equal to the root mean square of the noise.

Persons skilled in the art will, of course, readily adopt the teachings of the present invention to embodiments far different than those illustrated. Accordingly, the scope of the protection afforded to the invention should not be limited to the particular embodiments shown in the drawings and described above but shall be determined only in accordance with the appended claims.

The embodiments of the invention in which an exclusive property or privilege is claimed are defined as follows:

1. A device for superregulation of an amplifier-discriminator circuit comprising a voltage divider including an input and first and second voltage outputs, a D.-C. voltage supply having the output thereof connected to the input of said divider, said divider being adjusted such that the voltage amplitude of the first and second outputs thereof are respectively above and below the threshold level of said discriminator, a periodic signal generator, and means responsive to said periodic signal generator for alternately connecting the first and second outputs of said voltage divider to the input of said amplifier-discriminator circuit to apply thereto pulses alternately having amplitude values above and below the threshold level of said discriminator circuit, means for detecting which of said applied pulses are transmitted through said amplifier-discriminator circuit, said detected pulses indicating drift of said amplifier-discriminator circuit, and means responsive to said detecting means for adjusting the gain of said amplifier-discriminator circuit in accordance therewith.

2. The device according to claim 1 wherein said detecting means comprise means for generating a reference pulse for each of said high and low amplitude pulses applied to said amplifier-discriminator circuit, and means for detecting coincidence between said reference pulses and their associated pulses transmitted through said amplifier-discriminator circuit.

3. The device according to claim 2 wherein said coincidence detecting means comprise an and gate having two inputs and an output, means for applying said reference pulses associated only with said low amplitude pulses to one input of said and gate, means for applying pulses detected by said discriminator to the other input of said and gate, said and gate thereby having an output only for coincidence between pulses detected by said discriminator and said reference pulses associated with said low amplitude pulses, an inhibit gate having two inputs and one output, means for applying pulses detected by said discriminator to one input of said inhibit gate and means for applying said reference pulses associated only with said high amplitude pulses to the other input of said inhibit gate, said inhibit gate thereby having an output only for noncoincidence between pulses detected by said discriminator and said reference pulses associated with said high amplitude pulses.

4. The device according to claim 3 wherein said gain adjusting means comprise first and second pulse stretching circuits, a stepping relay, means for connecting the output of said and gate through said first pulse stretching circuit to said relay, means for connecting the output of said inhibit gate through said second pulse stretching circuit to said stepping relay, a D.-C. voltage supply, means for connecting said voltage supply to the grid bias of one stage of said amplifier, actuation of said relay responsive to the output of said gates thereby effecting a change in the voltage applied to the grid of one stage of said amplifier and thus the gain thereof.

5. A device for superregulation of an amplifier-discriminator circuit comprising means for synchronously generating first and second pulse trains, the pulses in each of said trains alternately having amplitude values above and below the threshold level of said discriminator, means for applying said first pulse train to the input of said amplifier-discriminator circuit, means for separating said second pulse train into a pulse train having low amplitude pulses and a pulse train having only high amplitude pulses, an and gate having two inputs and an output, means for applying said low amplitude pulse train to an input of said and gate, means for applying pulses transmitted through said amplifier-discriminator circuit to the other input of said and gate, an inhibit gate having two inputs and an output, means for applying said high amplitude pulse train to an input of said inhibit gate, means for applying pulses transmitted through said amplifier-discriminator circuit to the other input of said inhibit gate, a D.-C. voltage supply, means responsive to the outputs of said gates for applying D.-C. voltage to said amplifier to vary the gain thereof.

References Cited by the Examiner

UNITED STATES PATENTS

| 3,101,409 | 8/1963 | Fite | 250—83.6 X |
| 3,214,700 | 10/1965 | Hook | 328—115 X |

FOREIGN PATENTS 888,894 2/1962 Great Britain.

ROY LAKE, Primary Examiner.

J. B. MULLINS, Assistant Examiner.